Inventor:
Leon C. Agan.
By Schroeder, Merriam,
Hofgren & Brady.
Attorneys.

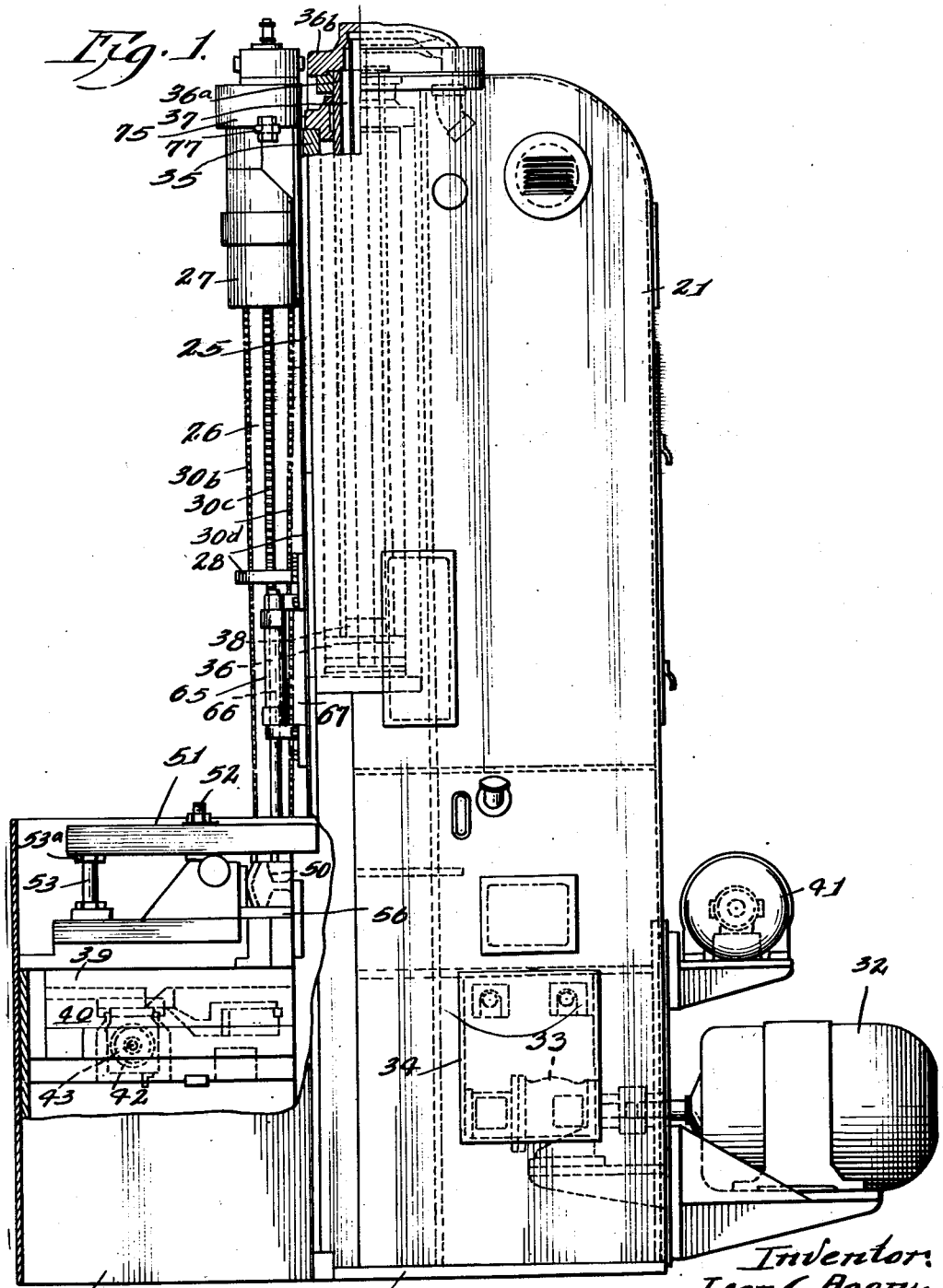

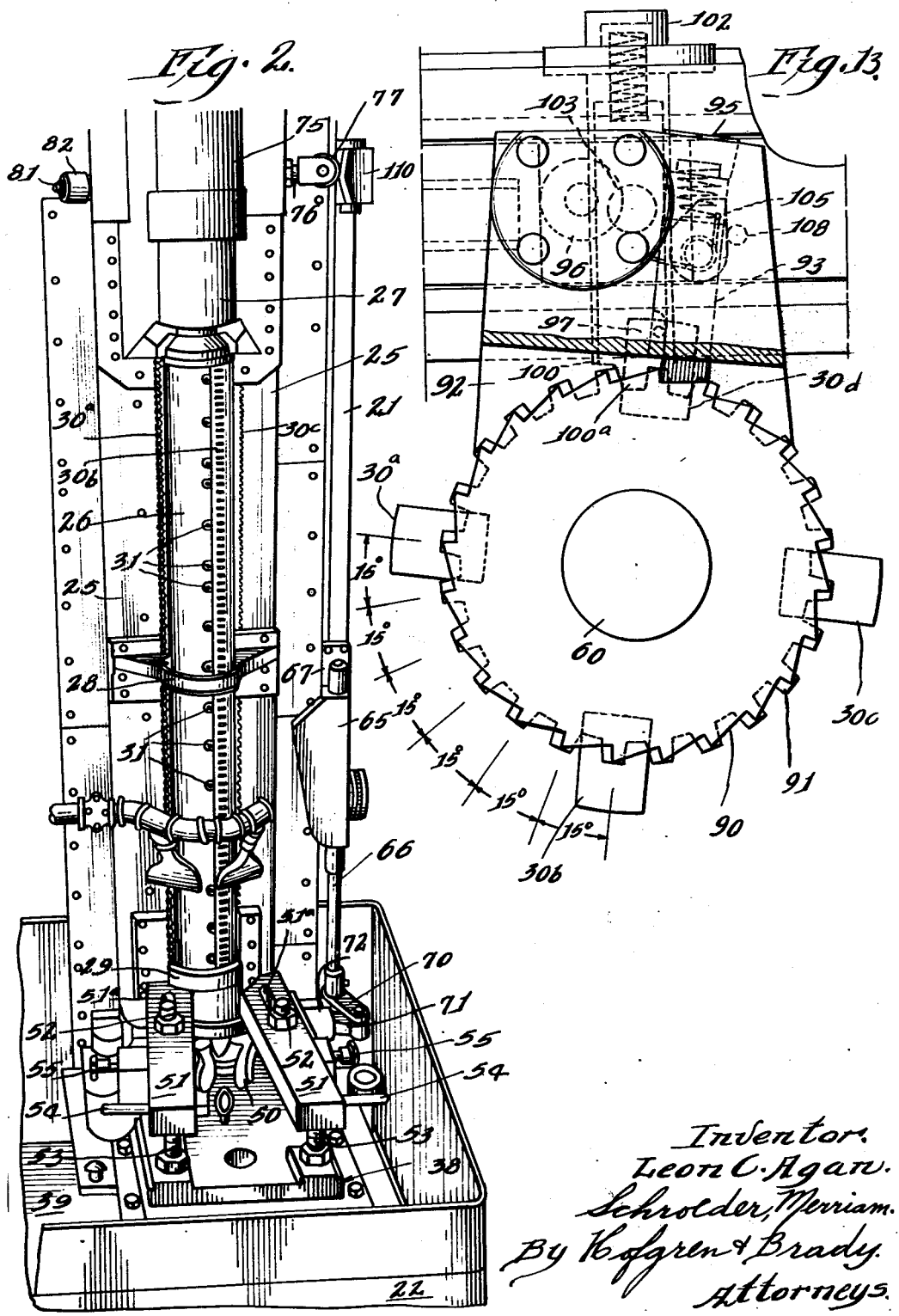

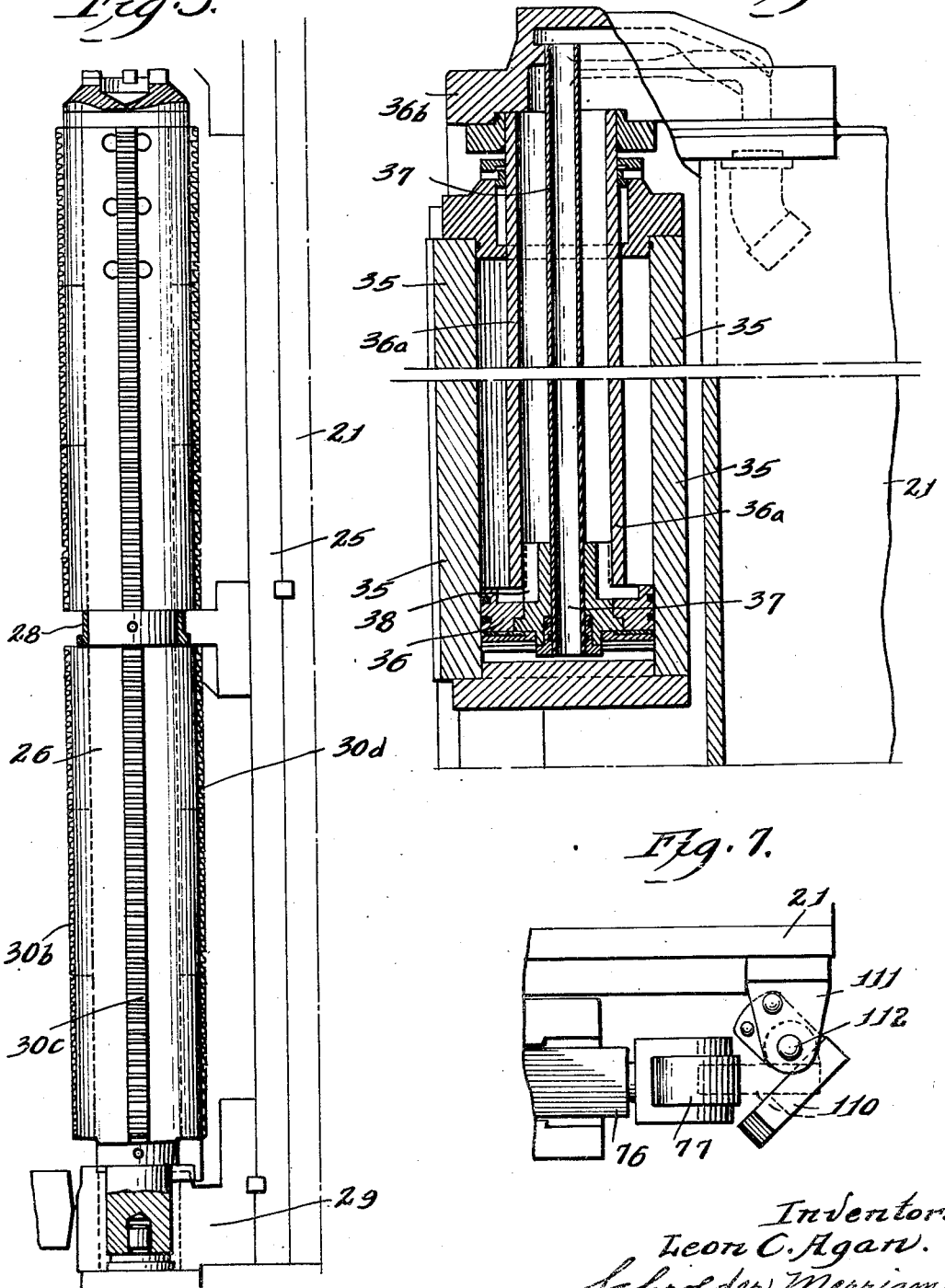

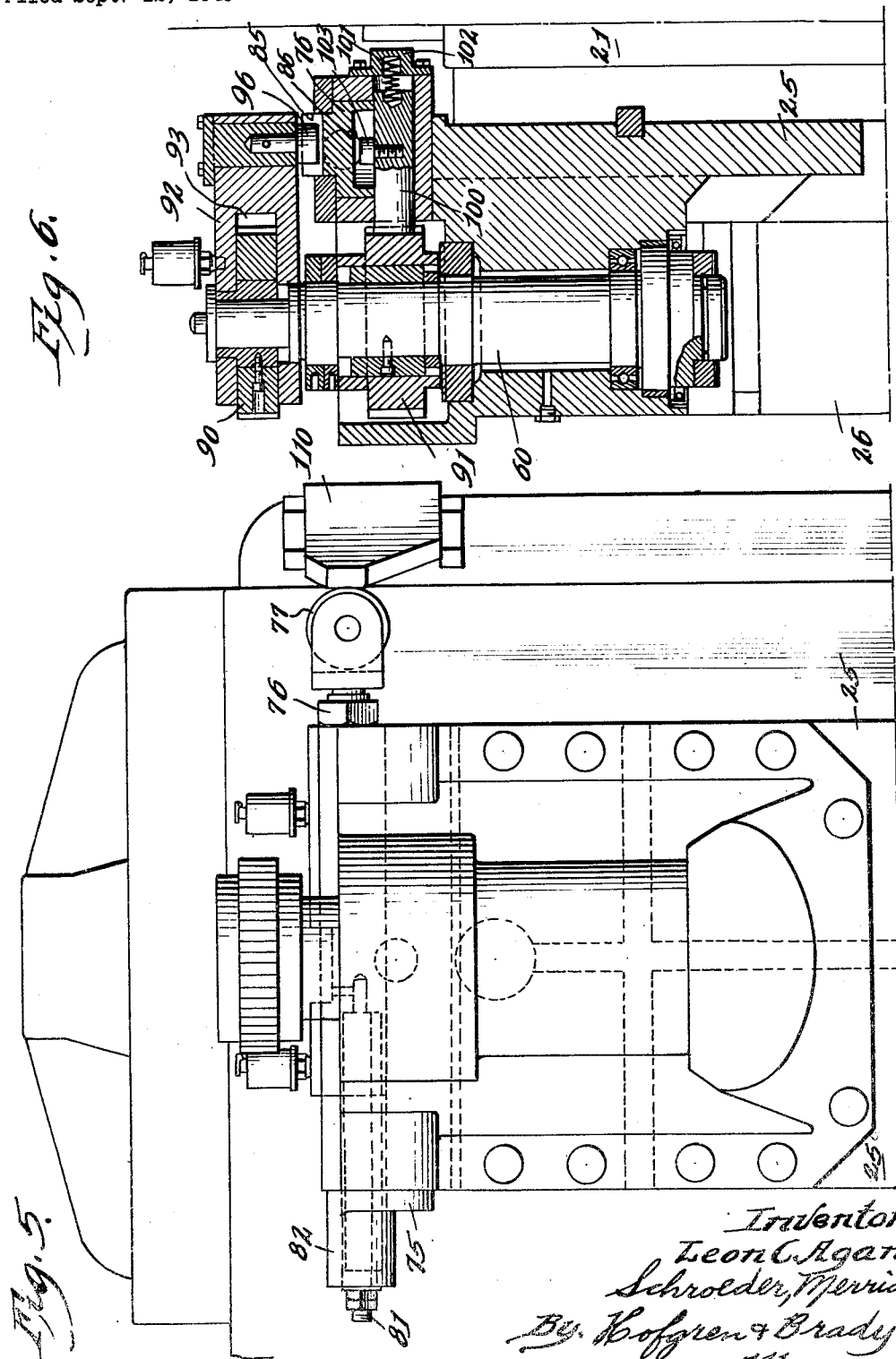

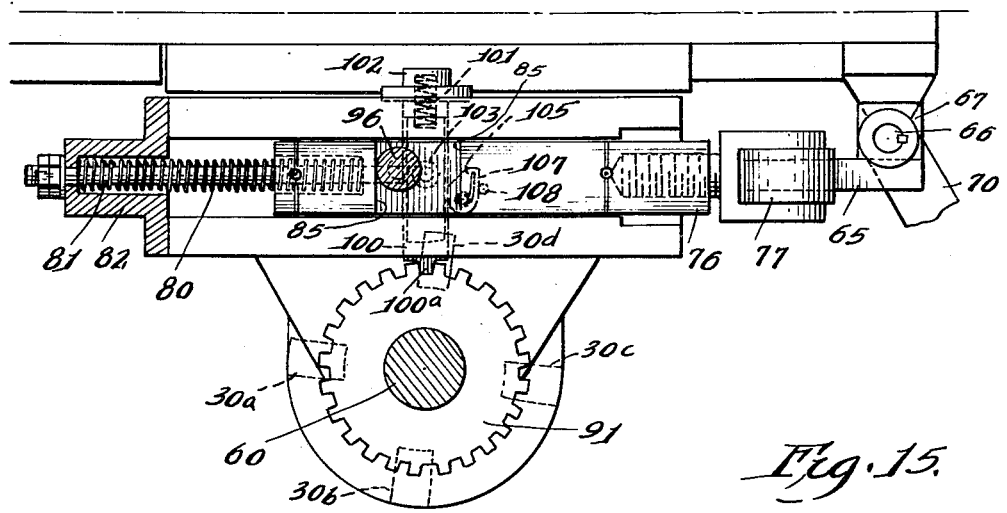
Fig. 14.
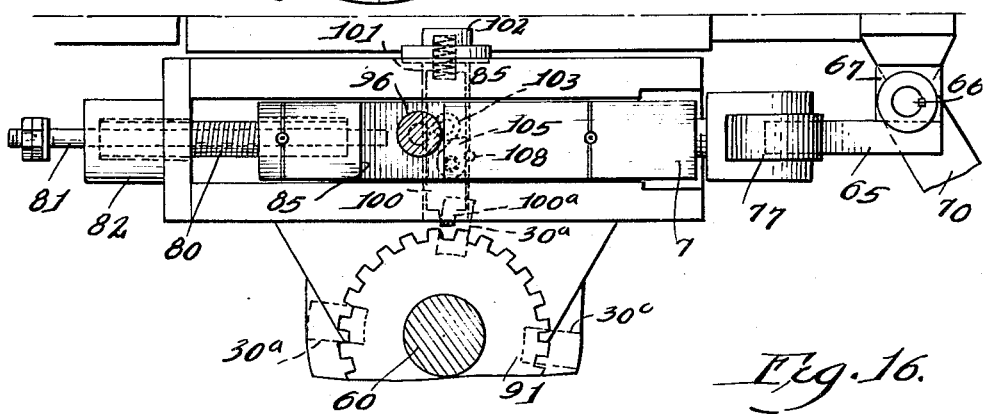
Fig. 15.
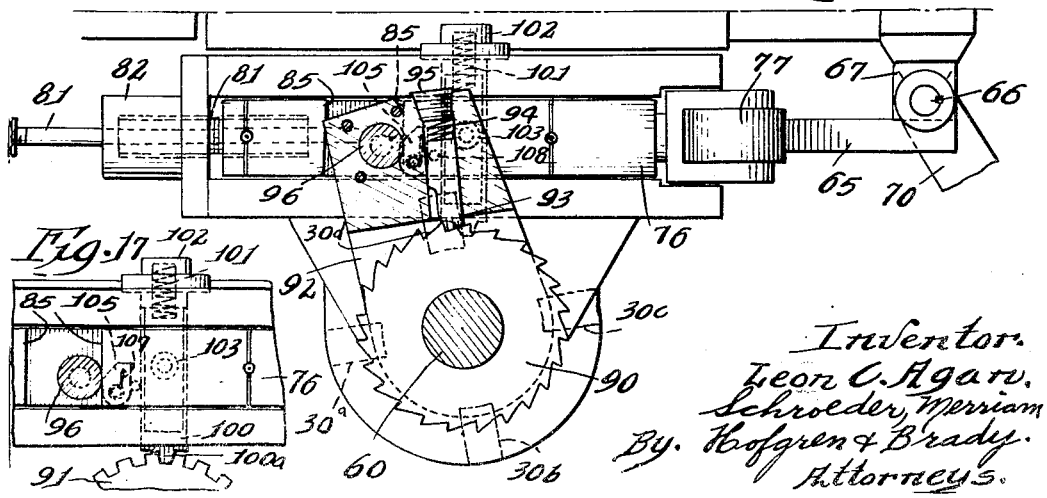
Fig. 16.
Fig. 17.
Inventor.
Leon C. Agan,
By Schroeder, Merriam, Hofgren & Brady.
Attorneys.

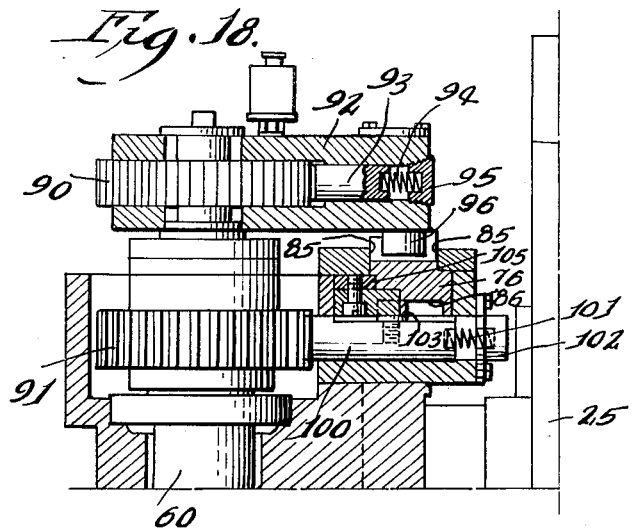
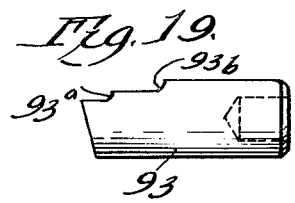
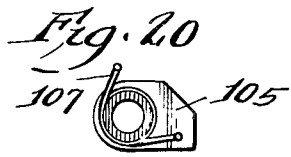
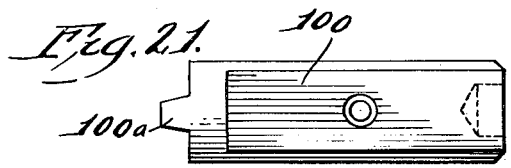
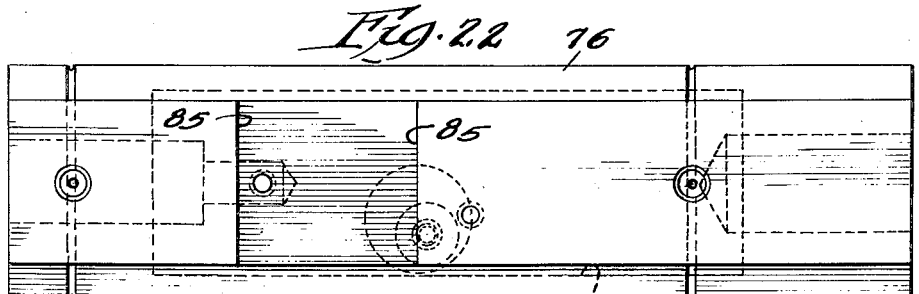
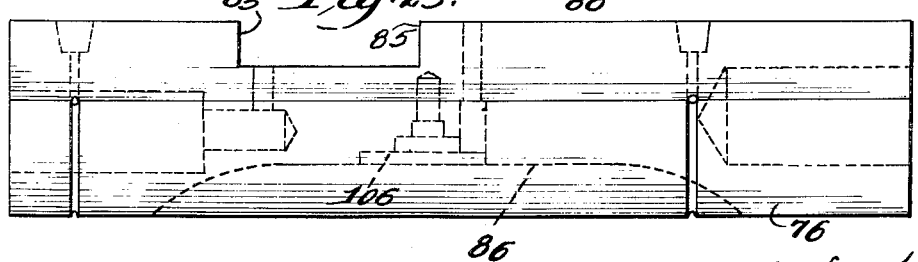

Patented Sept. 4, 1951

2,567,093

UNITED STATES PATENT OFFICE 2,567,093

BROACHING MACHINE

Leon C. Agan, Dexter, Mich., assignor to American Broach & Machine Co., a corporation of Michigan Application September 12, 1949, Serial No. 115,303

19 Claims. (Cl. 90—33)

1

This invention relates to broaching machines, and more particularly to broaching machines of the single ram type, and has as a general object to provide a new and improved broaching machine of that character.

A more particular object of the invention is to provide a broaching machine of the single ram type having a new and improved construction and a new mode of operation materially increasing the efficiency of operation of machines of that type.

Another object is to provide a broaching machine having a rotatable broach cutter body, and indexing means operable to rotate the cutter body so that the next broaching operation is performed upon a different portion of an arcuate surface of a work piece.

Yet another object is to provide a broaching machine having a rotatable cutter body and indexing means for rotating the cutter body through a predetermined arc equal to the width of the cutting edge of the broaching tool so that the tool broaches a different but adjoining portion of a semi-cylindrical surface of the work piece.

Yet another object is to provide such a machine wherein the indexing means includes a cam mounted on the machine and a ratchet mechanism carried by the cutter body of the machine and having a plunger adapted to engage the cam during the return stroke of the ram, and means connecting the cam to the work table of the machine for moving the cam out of the path of movement of the plunger on the broaching stroke.

Another object is to provide means for locking the cutter body against rotation and means operated by the plunger for releasing the lock to permit the indexing means to operate.

A further object of the invention is to provide in such a broaching machine an elongated broach cutter body mounted for rotation about its longitudinal axis and having a plurality of broaching tools mounted thereon arranged with their cutting edges spaced along an arc coaxial with said body, together with indexing means for rotating the cutter body through an arc of predetermined length about said axis.

A still further object of the invention is to provide a machine of the above character having a plurality of broaching tools mounted on a rotatable broach cutter body, the broaching surface of each tool being curved on an arc coaxial with the axis of rotation of said body.

An additional object of the invention is to

2 provide such a machine having four broaching tools spaced 90° from each other about the periphery of the cutter body, the cutting surface of each tool being curved and occupying an arc of substantially 15°, together with indexing means operable on the return stroke of the ram for rotating the cutter body through an arc of substantially 15°.

Further objects and advantages will appear as the description proceeds, taken in connection with the accompanying drawings which form a part of this application, in which:

Fig. 1 is a side elevation, partly in section, of a broaching machine embodying the features of the invention;

Fig. 2 is a fragmentary front perspective view of the machine;

Fig. 3 is an enlarged fragmentary side elevational view, partly in section, showing the broach cutter body;

Fig. 4 is a fragmentary vertical section through the ram of the machine, the center portion of the ram being broken away;

Fig. 5 is an enlarged front view of the upper portion of the broach cutter body of the machine and of an unlocking cam mechanism therefore;

Fig. 6 is a side elevation, partly in section, of the apparatus of Fig. 5;

Fig. 7 is a fragmentary top plan view of a portion of the apparatus of Fig. 5, showing the parts in one position in solid lines and in another position in broken lines;

Fig. 13 is a detail horizontal section showing a portion of the indexing mechanism of the machine;

Fig. 14 is a horizontal section showing the locking mechanism and a portion of the indexing mechanism;

Fig. 15 is a fragmentary view similar to Fig. 14, showing the parts in a different position;

Fig. 16 is a detail horizontal section through the indexing mechanism showing the parts in still a different position;

Fig. 17 is a fragmentary detail section of a portion of the apparatus of Fig. 16 with the ratchet support member removed;

Fig. 18 is a vertical section through the indexing mechanism of the machine;

Fig. 19 is a side elevational detail view of the ratchet plunger;

Fig. 20 is an elevational detail view of the unlocking cam;

Fig. 21 is a side elevational detail view of the lock plunger;

Fig. 22 is a top plan view of the operating or main plunger for the indexing mechanism; and Fig. 23 is a side elevational view of the main plunger.

Figure 8:
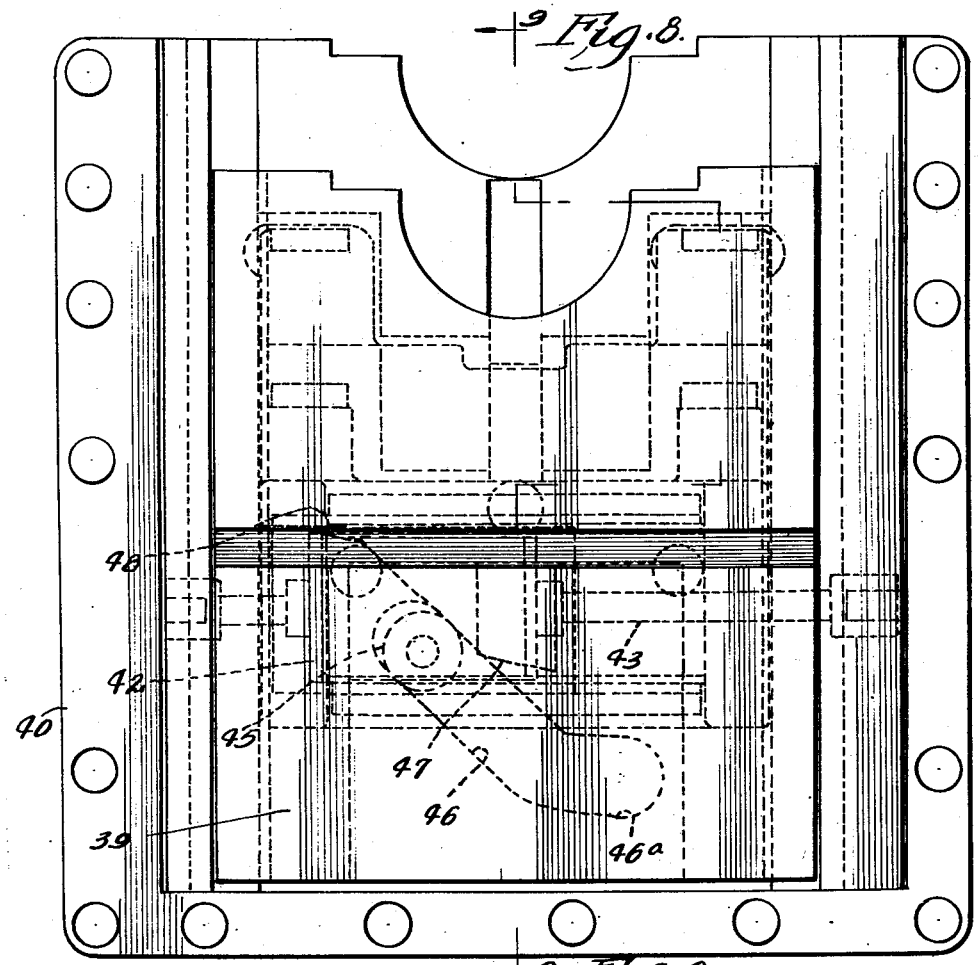
Fig. 8 is a top plan detail view of the reciprocable table of the machine.
Figure 9:
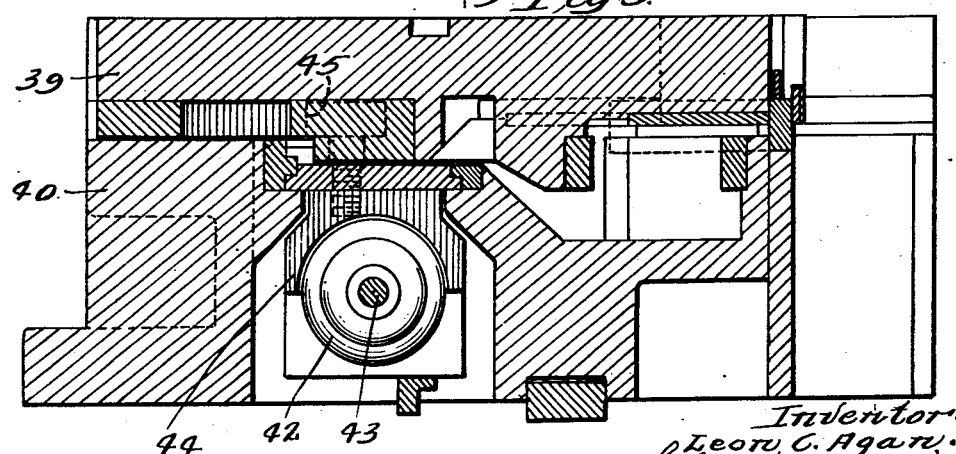
Fig. 9 is a longitudinal section through said table along the line of 9—9 of Fig. 8.

While I have shown in the drawings and will herein describe in detail the preferred embodiment of the invention, it is to be understood that I do not thereby intend to limit the invention to the specific form disclosed, but aim to cover all modifications and alternative constructions falling within the spirit and scope of the invention as expressed in the appended claims.

In the operation of broaching machines it is often required that a broaching operation be performed over a substantial area on an arcuate surface of a work piece, as for example, in broaching a semi-cylindrical surface on a work piece to provide part of a bearing housing crank case, or the like. In the past, this has been done by providing a broaching tool having an extremely wide cutting edge, or by utilizing a narrower broaching tool and moving the work piece after each broaching operation to expose a different surface of the work piece to the tool during the next operation. The utilization of a broaching tool having an extremely wide cutting surface necessarily increases the power requirements of the machine, resulting in a larger, heavier and more costly machine than would be required if a narrower broaching tool were used. For example, the machine illustrated herein may be constructed to develop forty tons pressure when six broaching strokes are utilized to broach a semi-cylindrical surface, an arc of thirty degrees on the surface being broached during each stroke; whereas it would require a 150 ton machine to remove the same amount of metal in a single stroke utilizing a semi-cylindrical broaching tool.

While, as pointed out above, a narrow broaching tool may be used and the work piece may be moved after each broaching stroke, it is a time consuming and laborious operation to loosen and carefully reposition the work piece after each broaching stroke, and unless the work piece is very carefully repositioned, the broaching operation will be improperly performed.

I have devised and am herewith disclosing and claiming a broaching machine having a rotatable broach cutter body which normally is locked against rotation, together with indexing means automatically operable after the broaching stroke to release the lock and rotate the cutter body through an arc of predetermined length so that during the next broaching stroke the cutting edge of the broaching tool is adjacent a different portion (but preferably an adjoining portion) of the surface of the work piece. The improved machine is particularly advantageous in broaching a semi-cylindrical surface on a work piece. In the particular embodiment illustrated the machine may automatically broach a semi-cylindrical surface while utilizing efficient broaching tools which cover only a portion of the surface during each broaching operation. I accomplish this by mounting on the ram of the machine a rotatable broach cutter body carrying a plurality of broaching tools, the cutting surface of each broaching tool being arcuate. On the return stroke after each broaching stroke an indexing mechanism automatically rotates the cutter body through an arc equal to the width of the cutting edge of each broaching tool so that the next broaching operation is performed on a surface portion of the work piece adjoining the surface portion broached during the last broaching stroke. Each tool, therefore, broaches a surface wider than the cutting edge of the tool.

In the preferred embodiment illustrated the cutter body is rotatable about its vertical axis and is provided with four broaching tools spaced 90° from each other around the periphery of the cutter body. The cutting edge of each broaching tool is curved on an arc coaxial with the cutter body, the cutting edge of each of said tools occupying an arc of about 15° of a circle. During the return stroke the cutter body is rotated 15° so that a complete cycle of six broaching and return strokes will cause a pair of the tools to broach a semicircle, or an arc of 180°. By providing four broaching tools I eliminate the necessity of returning the cutter body to its initial position, and during the next six-stroke cycle the cutter body may be rotated in the same direction, utilizing one of the broaching tools from the last cycle and utilizing one of the broaching tools which was idle during the last cycle to broach a semicylindrical surface.

Referring now more particularly to the drawings, Figures 1 and 2 show a vertical hydraulic broaching machine of the general type shown and described in Patent No. 2,239,237, which issued to F. J. Lapointe on April 22, 1941. Inasmuch as certain of the operating mechanisms are similar to the mechanisms disclosed in said Lapointe patent, they will not again be described in detail here, and reference is had to said patent for a complete disclosure in these regards.

The machine has a base 20 supporting a vertical frame or column 21 which has at the front a forwardly extending portion 22, frequently cast integral with the frame.

A vertically reciprocable ram on the column 21 carries adapter plates 25 which are slidable in ways on the column, and a broach cutter body 26 is mounted on the adapter plates for rotation about its longitudinal or vertical axis. The cutter body is mounted on the adapter plates by means of an upper mounting bracket 27, a center mounting bracket 28 and a lower mounting bracket 29. The cutter body is provided, in the embodiment shown, with four broaching tools, 30a, 30b, 30c and 30d, which are spaced ninety degrees from each other about the periphery of the cutter body. As best seen in Fig. 13, the cutting edge of each respective broaching tool is curved along an arc coaxial with the longitudinal axis of the cutter body, the cutting edge of each tool occupying an arc of substantially 15 degrees. The broaching tools are all securely mounted on the cutter body by means of hold down buttons 31 as shown in Fig. 2.

The ram is vertically reciprocable through a downward broaching stroke and through an upward return stroke by means of a conventional type hydraulic mechanism which will not be described in full detail here, since similar mechanisms are common in the art. For a full description of a similar hydraulic mechanism reference is had to Patent No. 2,239,237 above noted. This hydraulic mechanism is powered by a motor 32 which drives a pump 33 mounted in a housing in the column, this housing being closed by a removable plate 34 so that ready access can be had to the hydraulic mechanism.

The means for reciprocating the ram through a cycle including a broaching stroke and a return stroke include a cylinder 35 which is slidable on a stationary piston 36, the piston being mounted on a stationary outer tube 36a depending from a dome plate 36b. Hydraulic fluid is fed under the action of the pump 33 to the interior of the cylinder 35 through a feed tube 37, which opens into the bottom of the piston as shown in Fig. 4 so that the cylinder may be driven downward under positive pressure to perform the broaching stroke. As the cylinder moves down on the piston hydraulic fluid which is above the piston is exhausted through a port 38 and is returned to the hydraulic reservoir (not shown).

For carrying the work piece to and away from a broaching position a work supporting table designated at 39 is reciprocable on a bed 40 provided by the forwardly projecting portion 22. The table is reciprocable horizontally between a retracted position as shown in Fig. 8 and a broaching position by means of a hydraulic mechanism powered by a motor 41 and comprising a cylinder 42 which is reciprocable on a stationary piston which is mounted on a rod 43 secured to the bed of the machine. A bracket 44 carried by the piston forms a mounting for a roller 45 which engages a cam slot 46 in the reciprocable table. Movement of the cylinder 42 transversely of the machine (to the right as shown on Fig. 8) causes the table to move in a transverse direction (upwardly on the sheet as shown in Fig. 8). The cam slot 46 is formed as a dog leg and when the roller 45 enters the end portion 46a of the slot a shoulder 47 on the table engages a shoulder 48 carried by the cylinder, positively locking the table in broaching position during the broaching stroke.

Figure 10:
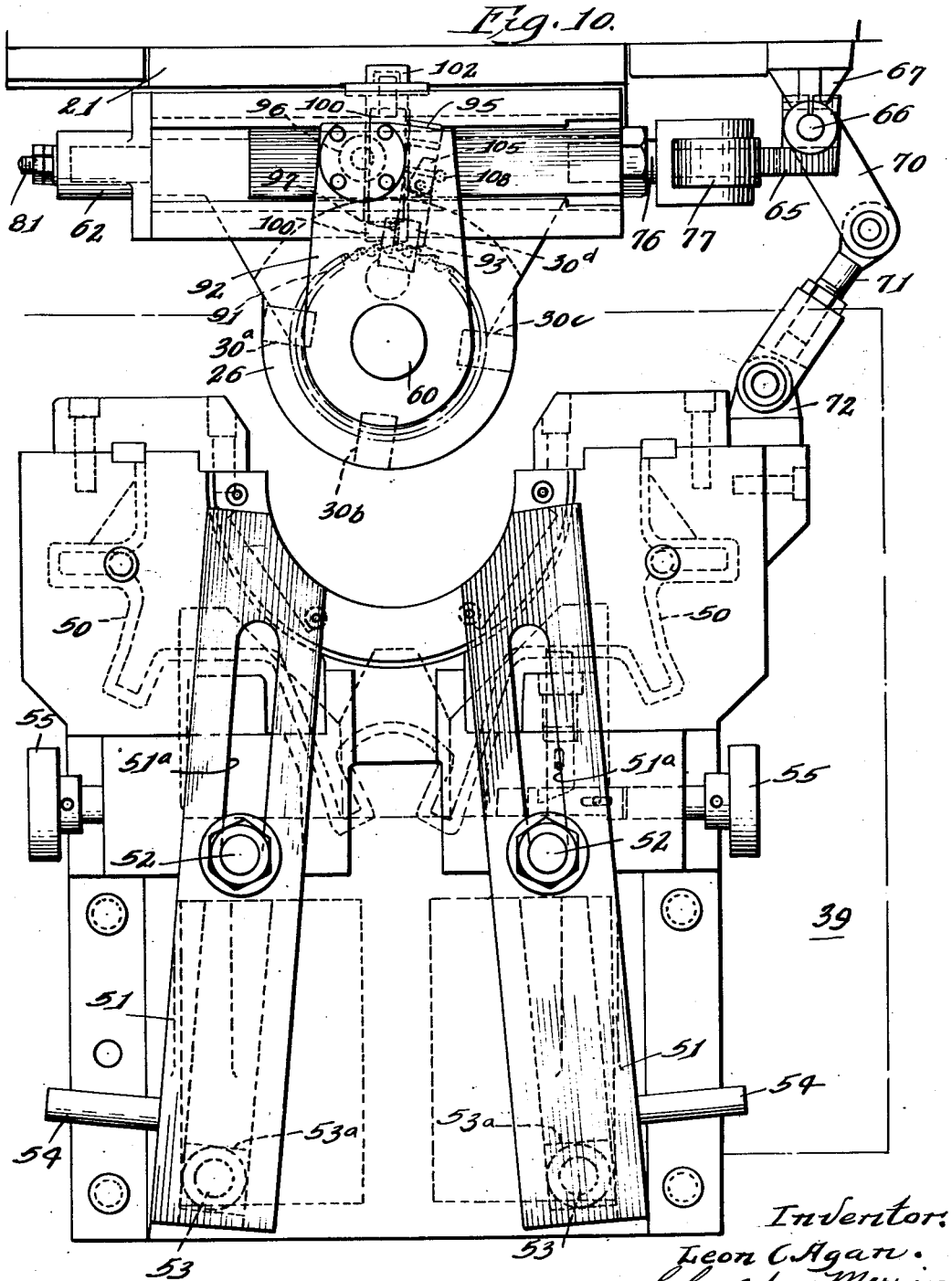
Fig. 10 is a top plan view, partly in section, showing the indexing mechanism and the fixture which carries the work piece on the table.
Figure 11:
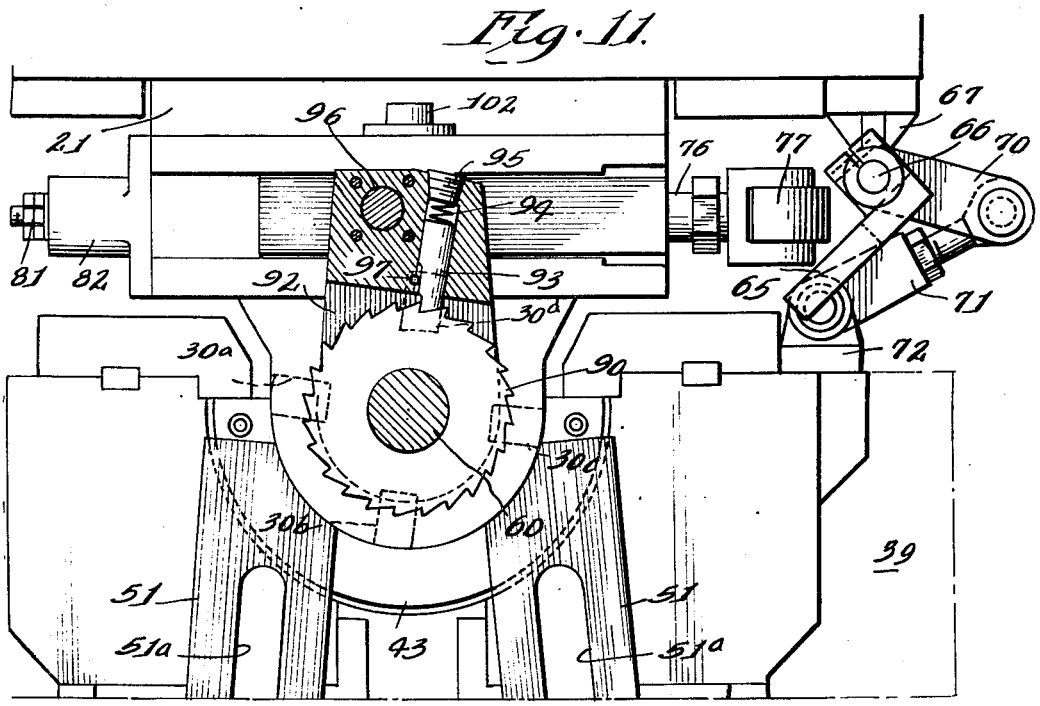
Fig. 11 is a fragmentary view similar to Fig. 10, but showing the parts in a different position.
Figure 12:
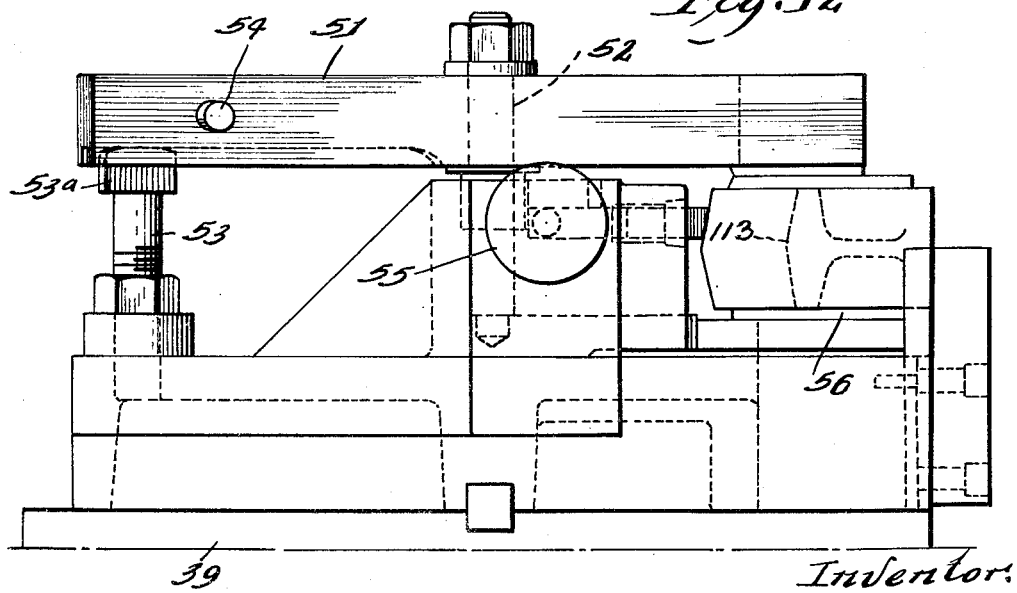
Fig. 12 is a side elevation of the fixture which carries the work piece.

Figs. 10, 11 and 12 illustrate a fixture which is mounted on the table for supporting a workpiece 113 which is to be broached. The table comprises clamping bars 51 having slots 51a which cooperate with bolts 52 to provide an adjustable locking means for the clamp arms. At the rear ends of each clamp arm is an undercut slot forming a trackway which engages nuts 53a on the top of studs 53 for supporting the clamp arms. The arms are provided with handles 54 for moving them into proper position to clamp the work piece, and jack screws 55 are provided for adjustment purposes in conventional fashion. The work piece 113 is supported on a hardened plate 56 as shown in Fig. 12.

The table is movable between a retracted position wherein the fixture and work piece are positioned away from the broaching tools as shown in Fig. 10 and a broaching position as shown in Fig. 11, and the table normally is in retracted position so that the work can be clamped by the fixture. Upon the initiation of a cycle of operation the table moves from the retracted position of Figs. 8 and 10 to the broaching position of Fig. 11 in order to bring the work into broaching position before the commencement of the broaching stroke of the ram. After the completion of the downward broaching stroke of the ram, the table moves back into retracted position in order to protect the work from being scratched by the teeth of the broaching tools; and after this movement of the table the ram moves upwardly through a return stroke.

The broach cutter body 26 is mounted on an arbor or spindle 60 for rotation about its vertical axis and indexing means are provided for rotating the cutter body about said axis through an arc of predetermined length after the completion of each broaching stroke. The indexing means for accomplishing this movement include a cam 65 mounted on a vertical shaft 66 which is rotatable in a bracket 67 carried on the column 21. A link 70 is keyed to the shaft 66 at the lower end thereof, the other end of this link being pivotally connected to a second link 71, the one end of which is pivotally connected to a bracket 72 projecting from the movable work supporting table. When the table is in its retracted position with the fixture in the position of Fig. 10 the links 70 and 71 cause the shaft 66 to assume one extreme position through clockwise rotation such that the cam 65 is positioned in a plane which may be considered as "flat" or parallel with the front of the machine, as shown in Figs. 10, 14, 15 and 16. When the table and fixture move forwardly into broaching position as shown in Fig. 11, the links 70 and 71 cause the shaft 66 to rotate in a counterclockwise direction moving the cam 50 to an angular position with reference to the front of the machine as shown in Fig. 11.

The indexing mechanism includes a ratcheting device housed at the top of the cutter body 26 in a casing 75. This ratchet mechanism includes a main actuating plunger 76 having thereon an actuating roller 77. The plunger is spring biased to the right as the parts appear in Fig. 14 by means of a compression spring 80 carried on a guide rod 81 extending into the bore of a cap 82, and as seen in Figs. 22 and 23 the upper side of the plunger 76 is provided with a notch 85, while the plunger also has a flat dished out portion 86 for a purpose to be hereafter described.

A ratchet wheel 90 is keyed to the spindle 60 near the outer end thereof, and a locking ring 91 is keyed to the spindle at a point spaced below the ratchet wheel. A ratchet support 92 is freely rotatable on the spindle, this support having a yoke which embraces the ratchet wheel 90, and the support having a body portion with an opening in which is housed a ratchet plunger 93. The plunger is urged by a spring 94 into engagement with the ratchet, the bore through the body of the ratchet support being closed by a cap 95. The ratchet support 92 carries a roller 96 which extends into the slot 85 in the plunger 76, the slot being longer than the diameter of the roller to provide for lost motion as will hereafter appear. The ratchet plunger is shown in detail in Fig. 19, this plunger having shoulders 93a and 93b to give clearance of operation and to provide proper operation, a pin 97 cooperating with the shoulder 93b to prevent the ratchet plunger from turning (see Fig. 11).

The locking ring 91 cooperates with a lock plunger 100 which at one end has a tooth 100a for engaging the teeth of the locking ring. The plunger 100 is urged by a spring 101 into engagement with the locking ring 91, a cap 102 retaining the spring in position. A cam follower roller 103 is carried on the locking plunger 100 and cooperates with a pawl 105 which is carried on the main plunger 76 in a recess 106 in the dished portion 86 thereof, the dished portion providing clearance to permit relative movement between the plunger 76 and the roller 103. The pawl 105 is biased counterclockwise by a spring 107 against a pin 108 (Fig. 10).

In the operation of the machine, when the work supporting table is in its normal retracted position with the fixture out of broaching position as shown in Fig. 10, the cam 65 is in the path of movement of the actuating roller 77 on the main plunger 76; and when the table is in its broaching position with the fixture as shown in Fig. 11, the cap 65 is in its angular position out of the path of movement of the roller 77. During the broaching stroke the table is in the position of Fig. 11. so that the plunger 76 passes by the cam 65 when being actuated thereby. However, before the return stroke of the ram the table moves to its retracted position of Fig. 10, rotating the cam 65 clockwise into the path of movement of the plunger 76 so that the plunger is moved to the left, actuating the ratchet mechanism to rotate the cutter body 26 counterclockwise as the parts are shown.

This ratcheting operation is shown in steps in Figs. 14, 15 and 16. In Fig. 14 the actuating roller 77 on the plunger 76 has just engaged the face of the cam 65 but no movement of the plunger 76 has taken place. With the parts in this position the ratchet plunger 93 is in engagement with the teeth of the ratchet wheel 90 and the tooth 100a of the locking plunger 100 is in engagement with the locking ring 91, holding the cutter body 26 against rotation. In Fig. 15 the roller 77 has moved part way over the face of the cam 65, causing the cam follower 103 on the lock plunger 100 to move across the face of the pawl 105 and retract the lock plunger from engagement with the locking ring 91. It should be noted that during this unlocking operation the roller 96 which is carried on the ratchet support 92 moves with reference to the plunger 76 in the slot 85, but since said slot is longer than the diameter of the roller the ratcheting mechanism is unaffected, although retraction of the locking plunger permits the spindle and cutter body to rotate when the ratcheting action does take place.

In Fig. 16 the main plunger 76 has moved farther to the left, bringing the roller 96 into engagement with the end of the slot 85 and moving said roller and ratchet support member 92 through an arc of 15 degrees in a counterclockwise direction. Since the ratchet support member 92 is connected to the ratchet wheel 90 through the ratchet plunger 93, the spindle and cutter body are rotated in a counterclockwise direction through an arc of 15 degrees. During this rotation the tooth 100a of the lock plunger rides along the top of a tooth of the locking ring 91 and when the limit of ratcheting movement is reached the tooth of the lock plunger moves into engagement with the locking ring under force of the spring 101. The teeth on the locking ring are 15 degrees apart as seen in Fig. 13.

When the roller 77 on the main plunger 76 moves away from the cam 65 as the return stroke of the ram progresses, the parts are returned to the position of Fig. 14 under force exerted by the spring 80. The engagement of the lock plunger with the locking ring holds the spindle 60 against rotation during this return movement of the ratchet support 92. The ratchet support 92, which is freely rotatable on the spindle 60, is free to move back to the position of Fig. 14, being urged by the roller in engagement with the other or left end of the slot 85. The ratchet plunger slips on the ratchet wheel to allow this return motion. The pawl 105 is rocked counterclockwise about its pivot to pass the cam follower 103 in returning to the position illustrated in Fig. 14 and the spring 107 then rocks the pawl 105 clockwise to its original position against pin 108.

The ratchet teeth of the mechanism are spaced 15 degrees apart so that upon each indexing operation the cutter body rotates through an arc of 15 degrees. Since the cutting surface of each broaching tool occupies an arc of 15 degrees, each successive broaching operation will be performed immediately adjacent that portion of the surface of the work piece 113 which was broached on the last operation. By providing four broaching tools as shown, it is never necessary to return the cutter body to its initial position by reverse rotation. With the apparatus shown, a cycle may comprise six broaching and return strokes, and during such a cycle (with the machine starting in the position of Fig. 2) the broaching tools 30b and 30c would each move through an arc of 90 degrees and together would broach a complete semicircle. If a new work piece were then inserted and another cycle initiated the tools 30c and 30d would together broach a semicircle.

The operating mechanism of the machine preferably is arranged to provide automatic operation through six broaching and return strokes so that once the machine is started it broaches a complete semicircle and stops.

When it is desired to rotate the cutter body 26 between broaching operations, as for example in changing the broaching tools, it is necessary to release the lock plunger 100 from engagement with the locking ring 91 without actuating the ratcheting mechanism. In order to accomplish this a cam 110 is carried on the frame near the top of the machine on a bracket 111. This cam normally is maintained in an angular position, as shown in Fig. 7, where it is out of the path of movement of the roller 77, a notch-and-detent friction connection being provided to retain the cam in this position. When it is desired to utilize the cam to release the lock plunger the cam is manually rotated about its mounting shaft 112 to the position shown in broken lines in Fig. 7 where it is in the path of movement of the roller 77. A detent frictionally holds the cam in this position. When the ram is raised the roller 77 rides on the face of the cam 110, moving the parts to the position of Fig. 15 wherein the lock plunger 100 is retracted, but no ratcheting action has taken place because of the lost motion provided by the wide slot 85. With the parts in this position the cutter body 26 is freely rotatable in a counterclockwise direction but not in a clockwise direction because the ratchet plunger 93 always contacts the teeth of the ratchet wheel 90.

I claim:

1. A broaching machine comprising, in combination, a reciprocable broach-carrying ram, a tool carrying body rotatably mounted thereon, a work supporting table, means for reciprocating said ram through a cycle including a broaching stroke and a return stroke, and means operable to index said body relative to said ram intermediate successive broaching strokes at a plurality of positions around an arc so that a surface of greater width than a tool on said body may be broached during a plurality of broaching strokes.

2. A broaching machine comprising, in combination, a reciprocable broach-carrying ram having a tool carrying body rotatably supported thereon, a work supporting table movable between retracted and broaching positions; means for reciprocating said ram through a cycle including a broaching stroke and a return stroke, means for reciprocating said table through a cycle including an advancing movement to broaching position and a return movement to retracted position, and means operable to index said body through an arc after the completion of each broaching stroke so that a curved surface of greater width than the tool may be broached during a succession of broaching strokes.

3. A broaching machine comprising, in combination, a reciprocable broach-carrying ram having a tool carrying body rotatably supported thereon, a work supporting table movable between retracted and broaching positions, means for reciprocating said ram through a cycle including a broaching stroke and a return stroke; means for reciprocating said table through a cycle including an advancing movement to broaching position and a return movement to retracted position, and means operable to index said body intermediate successive broaching strokes so that a surface of greater width than a tool on said body may be broached, said indexing means including a cam mounted on said machine and a ratchet mechanism mounted on said body and having a plunger adapted to engage said cam only during said return stroke.

4. A broaching machine comprising, in combination, a reciprocable broach-carrying ram having a tool carrying body rotatably supported thereon, a work supporting table movable between retracted and broaching positions in a plane transverse to the line of movement of said ram; means for reciprocating said ram through a cycle including a broaching stroke and a return stroke, means for reciprocating said table through a cycle including an advancing movement to broaching position and a return movement to retracted position, means operable after the completion of the broaching stroke to index said body through an arc of a circle so that curved surface of greater width than the tool may be broached, said indexing means including a cam member mounted on said machine and a ratchet mechanism mounted on said body and having a plunger member adapted to engage said cam only during said return stroke; and means for moving one of said members to prevent actuation of the ratchet mechanism during the broaching stroke.

5. A broaching machine comprising, in combination, a reciprocable broach-carrying ram having a tool carrying body rotatably mounted thereon, a work supporting table, means for reciprocating said ram through a cycle including a broaching stroke and a return stroke, means operable during said return stroke to index said body relative to said ram through an arc of predetermined length so that a curved surface of greater width than the tool may be broached, said indexing means including a cam mounted on said machine for movement from an operative to an inoperative position and a ratchet mechanism mounted on said body and having a plunger adapted to engage said cam on a return stroke when the cam is in operative position, and means for moving said cam to its inoperative position out of the path of movement of said plunger during a broaching stroke.

6. A broaching machine comprising, in combination, a reciprocable broach-carrying ram having a tool carrying body rotatably mounted thereon for indexing movements about its axis; a work supporting table movable between retracted and broaching positions in a plane transverse to the line of movement of said ram; means for reciprocating said ram through a cycle including a broaching stroke and a return stroke; means for reciprocating said table through a cycle including an advancing movement to broaching position before a broaching stroke of the ram commences and a return movement to retracted position after the completion of a broaching stroke and before the commencement of a return stroke; means for locking said cutter body against rotation relative to said ram; means operable during said return stroke to release said lock and index said body relative to said ram through an arc of predetermined length so that a surface of greater width than the tool may be broached, said indexing means including a cam mounted on said machine for movement from an operative position to an inoperative position and a ratchet mechanism mounted on said body and having a plunger adapted to engage said cam during a return stroke when the cam is in operative position; and means connecting said cam to said table for moving the cam to its inoperative position out of the path of movement of said plunger during the broaching stroke.

7. A broaching machine comprising, in combination, a reciprocable broach-carrying ram having a broach cutter body thereon; a cutting tool on said cutter body, said tool having a curved cutting surface; a work supporting table movable between retracted and broaching positions in a plane transverse to the line of movement of said ram; means for reciprocating said ram through a cycle including a broaching stroke and a return stroke; means for reciprocating said table through a cycle including an advancing movement to broaching position and a return movement to retracted position; and means operable to index said cutter body through an arc of a circle substantially equal in length to the width of the cutting surface of the tool so that the tool broaches a different portion of a curved surface during each successive broaching stroke.

8. Apparatus of the character claimed in claim 7, wherein said cutter body has a plurality of broaching tools mounted thereon, the cutting edges of all of the tools being curved along an arc of a circle having its center at the axis of rotation of said body.

9. Apparatus of the character claimed in claim 7, wherein said cutter body has a plurality of broaching tools mounted thereon and having arcuate cutting edges spaced along a circle concentric with said cutter body, and wherein said indexing means rotate said tools through an arc substantially as long as the width of the cutting edge of one of said tools.

10. A broaching machine comprising, in combination, a reciprocable broach-carrying ram having a broach cutter body rotatably supported thereon for indexing movements about its axis, a plurality of broaching tools mounted on said body and having arcuate cutting edges spaced along common circles coaxial with said body; a work supporting table; means for reciprocating said ram through a cycle including a broaching stroke and a return stroke; means for locking said cutter body against rotation relative to said ram; and means operable to release said lock and index said cutter body relative to said ram through an arc of predetermined length about the axis of said body so that a surface of greater width than the cutting edge of the tool may be broached.

11. A broaching machine comprising, in combination, a reciprocable broach-carrying ram having a broach cutter body rotatably supported thereon for indexing movements about its axis, said body having a plurality of broaching tools mounted thereon arranged with their cutting edges spaced along an arc coaxial with said body; a work supporting table movable between retracted and broaching positions in a plane transverse to the line of movement of said ram; means for reciprocating said ram through a cycle including a broaching stroke and a return stroke; means for reciprocating said table through a cycle including an advancing movement to broaching position and a return movement to retracted position; and means operable to index said cutter body through an arc of predetermined length about the axis of said body so that a curved surface of greater width than the cutting edge of the tool may be broached.

12. Apparatus of the character claimed in claim 11, wherein the broaching tools are spaced 90° apart about the periphery of said body.

13. Apparatus of the character claimed in claim 11, wherein the broaching tools are spaced 90° apart about the periphery of said body, and wherein said indexing means rotate said tools through an arc substantially as long as the width of the cutting edge of a tool on said body.

14. Apparatus of the character claimed in claim 11, wherein there are four broaching tools spaced 90° apart about the periphery of said body, the cutting edge of each tool occupying an arc of substantially 15°, and wherein the indexing means rotate said body through an arc of substantially 15°.

15. A vertical broaching machine comprising, in combination, a vertically reciprocable broach-carrying ram, a broach cutter body rotatably supported thereon for indexing movements about a vertical axis, a plurality of vertically extending broaching tools mounted on said body and having arcuate cutting edges spaced along common circles coaxial with said body; a work supporting table movable horizontally between retracted and broaching positions; means for reciprocating said ram through a cycle including a broaching stroke and a return stroke; means for reciprocating said table through a cycle including an advancing movement to broaching position and a return movement to retracted position; and means operable during the return stroke to index said cutter body about said axis through an arc of predetermined length to cause each tool to broach a different portion of an arcuate surface during each successive broaching stroke, said indexing means including a cam mounted on said machine for movement from an operative to an inoperative position and a ratchet mechanism mounted on said body and having a plunger adapted to engage said cam on each return stroke when the cam is in operative position.

16. A vertical broaching machine comprising, in combination, a vertically reciprocable broach-carrying ram, a broad cutter body rotatably supported thereon for indexing movements about a vertical axis, said body having a plurality of broaching tools mounted thereon having arcuate cutting edges spaced along common circles coaxial with said body, a work supporting table movable horizontally between retracted and broaching positions; means for reciprocating said ram through a cycle including a broaching stroke and a return stroke, means for reciprocating said table through a cycle including an advancing movement to broaching position and a return movement to retracted position; means for locking said cutter body against indexing movement relative to said ram; means operable during the return stroke to release said lock and index said cutter body relative to said ram about said axis through an arc of predetermined length to cause each tool to broach a different but adjoining portion of an arcuate surface during each successive broaching stroke, said indexing means including a cam mounted on said machine and shiftable from an operative to an inoperative position and a ratchet mechanism mounted on said body and having a plunger adapted to engage said cam on each return stroke when the cam is in operative position; and means effective to shift said cam to its inoperative position out of the path of movement of said plunger during the broaching stroke.

17. A vertical broaching machine comprising, in combination, a vertically reciprocable broach-carrying ram, an elongated broach cutter body rotatably supported thereon for indexing movements about a vertical axis, said body having a plurality of broaching tools mounted thereon spaced 90° apart about the periphery of said body and having arcuate cutting edges curved along a common circle; a work supporting table movable horizontally between retracted and broaching positions; means for reciprocating said ram through a cycle including a broaching stroke and a return stroke; means for reciprocating said table through a cycle including an advancing movement to broaching position before a broaching stroke commences and a return movement to retracted position after the completion of each broaching stroke and before commencement of the return stroke; means operable during the return stroke to index said cutter body about said axis through an angle to cause each tool to broach successively adjoining portions of a semi-cylindrical work surfaced during successive broaching strokes, said indexing means including a cam mounted on said machine and shiftable from an operative to an inoperative position and a ratchet mechanism mounted on said body and having a plunger adapted to engage said cam on each return stroke when the cam is in its operative position; and means connecting said cam to said table effective to shift the cam to its inoperative position out of the path of movement of said plunger during the broaching stroke.

18. A broaching machine comprising, in combination, a reciprocable broach-carrying ram having a tool carrying body rotatably mounted thereon for indexing movements about a vertical axis; a work supporting table movable between retracted and broaching positions; means for reciprocating said ram through a cycle including a broaching stroke and a return stroke; means for reciprocating said table through a cycle including an advancing movement to broaching position and a return movement to retracted position; and means operable to index said body through an arc so that a curved surface of greater width than the tool may be broached, said indexing means including a cam mounted on said machine and a ratchet mechanism comprising a main actuating plunger movably mounted on the machine and adapted to engage said cam during a return stroke, a ratchet wheel fixedly mounted on said cutter body, a ratchet support member rotatably mounted on said body, a ratchet plunger carried on said support and engaging said ratchet wheel to prevent relative movement between said wheel and support in one direction and permit such relative movement in the opposite direction, and means positioned between said ratchet support and main plunger for indexing said ratchet support and cutter body in said one direction upon actuation of said main plunger.

19. A broaching machine comprising, in combination, a reciprocable broach-carrying ram having a tool carrying body rotatably supported thereon; a work supporting table movable between retracted and broaching positions in a plane transverse to the line of movement of said ram; means for reciprocating said ram through a cycle including a broaching stroke and a return stroke; means for reciprocating said table through a cycle including an advancing movement to broaching position before a broaching stroke of the ram commences and a return movement to retracted position after the completion of a broaching stroke and before the commencement of a return stroke; means for locking said tool carrying body against rotation relative to said ram; means operable during each return stroke to release said lock and index said body relative to said ram through an arc of predetermined length so that a curved surface of greater width than the tool may be broached, said indexing means including a cam mounted on said machine and shiftable from an operative to an inoperative position and a ratchet mechanism comprising a main actuating plunger reciprocably mounted on the machine for engagement with said cam on each return stroke when the cam is in operative position, a ratchet wheel fixedly mounted on said tool carrying body, a ratchet support member rotatably mounted on said body, a ratchet plunger carried on said support and engaging said ratchet wheel to prevent relative movement between said wheel and support in one direction and permit such relative movement in the opposite direction, and means providing a lost motion connection between said ratchet support and main plunger for rotating said ratchet support and cutter body in said one direction upon movement of said main plunger, said main plunger having means thereon for releasing said lock during the lost motion movement between the main plunger and ratchet support.

LEON C. AGAN.

REFERENCES CITED

The following references are of record in the file of this patent:

UNITED STATES PATENTS

| Number | Name | Date |
|---|---|---|
| 1,660,813 | Perkins | Feb. 28, 1928 |
| 1,783,637 | Tweddell | Dec. 2, 1930 |
| 1,867,592 | Richards | July 19, 1932 |